(12) United States Patent
Manni et al.

(10) Patent No.: US 8,832,829 B2
(45) Date of Patent: *Sep. 9, 2014

(54) NETWORK-BASED BINARY FILE EXTRACTION AND ANALYSIS FOR MALWARE DETECTION

(75) Inventors: Jayaraman Manni, San Jose, CA (US); Ashar Aziz, Fremont, CA (US); Fengmin Gong, Livermore, CA (US); Upendran Loganathan, Santa Clara, CA (US); Muhammad Amin, Fremont, CA (US)

(73) Assignee: FireEye, Inc., Milpitas, CA (US)

( * ) Notice: Subject to any disclaimer, the term of this patent is extended or adjusted under 35 U.S.C. 154(b) by 539 days.

This patent is subject to a terminal disclaimer.

(21) Appl. No.: 12/571,294

(22) Filed: Sep. 30, 2009

(65) Prior Publication Data

US 2011/0078794 A1    Mar. 31, 2011

(51) Int. Cl.
- G06F 11/00 (2006.01)
- G06F 21/56 (2013.01)
- H04L 29/06 (2006.01)

(52) U.S. Cl.
CPC ............ G06F 21/567 (2013.01); G06F 21/566 (2013.01); H04L 63/1408 (2013.01)
USPC .................... 726/22; 726/23; 726/24; 726/25

(58) Field of Classification Search
CPC .. H04L 63/1408; G06F 21/567; G06F 21/566
USPC ..................................................... 726/22–25
See application file for complete search history.

(56) References Cited

U.S. PATENT DOCUMENTS

| | | | |
|---|---|---|---|
| 4,292,580 A | 9/1981 | Ott et al. |
| 5,175,732 A | 12/1992 | Hendel et al. |
| 5,440,723 A | 8/1995 | Arnold et al. |
| 5,657,473 A | 8/1997 | Killean et al. |
| 5,842,002 A | 11/1998 | Schnurer et al. |
| 5,978,917 A | 11/1999 | Chi |
| 6,088,803 A | 7/2000 | Tso et al. |
| 6,094,677 A | 7/2000 | Capek et al. |

(Continued)

FOREIGN PATENT DOCUMENTS

| | | |
|---|---|---|
| GB | 2439806 | 1/2008 |
| WO | 026928 A2 | 1/2002 |

(Continued)

OTHER PUBLICATIONS

Abdullah et al., Visualizing Network Data for Intrusion Detection, 2005 IEEE Workshop on Information Assurance and Security, pp. 100-108.*

(Continued)

*Primary Examiner* — Luu Pham
*Assistant Examiner* — Roderick Tolentino
(74) *Attorney, Agent, or Firm* — Blakely, Sokoloff, Taylor & Zafman LLP

(57) ABSTRACT

A system and method are disclosed for network-based file analysis for malware detection. Network content is received from a network tap. A binary packet is identified in the network content. A binary file, including the binary packet, is extracted from the network content. It is determined whether the extracted binary file is detected to be malware.

97 Claims, 8 Drawing Sheets

(56) References Cited

U.S. PATENT DOCUMENTS

| | | |
|---|---|---|
| 6,269,330 B1 | 7/2001 | Cidon et al. |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sørhaug et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,408 B1 | 7/2006 | Pak |
| 7,093,239 B1 | 8/2006 | van der Made |
| 7,100,201 B2 | 8/2006 | Izatt |
| 7,159,149 B2 | 1/2007 | Spiegel |
| 7,231,667 B2 | 6/2007 | Jordan |
| 7,240,364 B1 | 7/2007 | Branscomb et al. |
| 7,240,368 B1 | 7/2007 | Roesch et al. |
| 7,251,215 B1 | 7/2007 | Turner et al. |
| 7,287,278 B2 | 10/2007 | Liang |
| 7,308,716 B2 | 12/2007 | Danford et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang |
| 7,530,104 B1 | 5/2009 | Thrower et al. |
| 7,540,025 B2 | 5/2009 | Tzadikario |
| 7,565,550 B2 | 7/2009 | Liang et al. |
| 7,568,233 B1 | 7/2009 | Szor et al. |
| 7,603,715 B2 | 10/2009 | Costa |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,849,506 B1 | 12/2010 | Dansey et al. |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Bennett |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,201,246 B1 | 6/2012 | Wu et al. |
| 8,204,984 B1 | 6/2012 | Aziz et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,370,938 B1 | 2/2013 | Daswani et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,479,174 B2 | 7/2013 | Chiriac |
| 8,510,827 B1 | 8/2013 | Leake et al. |
| 8,510,828 B1 | 8/2013 | Guo et al. |
| 8,516,593 B2 | 8/2013 | Aziz |
| 8,528,086 B1 | 9/2013 | Aziz |
| 8,539,582 B1 | 9/2013 | Aziz et al. |
| 8,549,638 B2 | 10/2013 | Aziz |
| 8,561,177 B1 | 10/2013 | Aziz et al. |
| 8,566,946 B1 | 10/2013 | Aziz et al. |
| 8,584,094 B2 | 11/2013 | Dadhia et al. |
| 8,584,239 B2 | 11/2013 | Aziz et al. |
| 8,595,834 B2 | 11/2013 | Xie et al. |
| 8,635,696 B1 | 1/2014 | Aziz |
| 8,713,681 B2 | 4/2014 | Silberman et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0144156 A1 | 10/2002 | Copeland, III |
| 2002/0162015 A1 | 10/2002 | Tang |
| 2002/0166063 A1 | 11/2002 | Lachman et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0115483 A1 | 6/2003 | Liang |
| 2003/0188190 A1 | 10/2003 | Aaron et al. |
| 2003/0200460 A1 | 10/2003 | Morota et al. |
| 2003/0212902 A1* | 11/2003 | van der Made ............... 713/200 |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0093513 A1 | 5/2004 | Cantrell et al. |
| 2004/0111531 A1 | 6/2004 | Staniford et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |

(56) References Cited

U.S. PATENT DOCUMENTS

| | | |
|---|---|---|
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0265331 A1 | 12/2005 | Stolfo |
| 2006/0010495 A1 | 1/2006 | Cohen et al. |
| 2006/0015715 A1 | 1/2006 | Anderson |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino |
| 2006/0191010 A1 | 8/2006 | Benjamin |
| 2006/0221956 A1 | 10/2006 | Narayan et al. |
| 2006/0242709 A1* | 10/2006 | Seinfeld et al. ............... 726/24 |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0094730 A1 | 4/2007 | Bhikkaji et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0271446 A1 | 11/2007 | Nakamura |
| 2008/0005782 A1 | 1/2008 | Aziz |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0098476 A1 | 4/2008 | Syversen |
| 2008/0120722 A1 | 5/2008 | Sima et al. |
| 2008/0134334 A1* | 6/2008 | Kim et al. ............... 726/23 |
| 2008/0141376 A1 | 6/2008 | Clausen |
| 2008/0184373 A1 | 7/2008 | Traut et al. |
| 2008/0189787 A1 | 8/2008 | Arnold et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane |
| 2008/0307524 A1 | 12/2008 | Singh et al. |
| 2008/0320594 A1 | 12/2008 | Jiang |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0044024 A1 | 2/2009 | Oberheide et al. |
| 2009/0044274 A1 | 2/2009 | Budko et al. |
| 2009/0083369 A1 | 3/2009 | Marmor |
| 2009/0083855 A1 | 3/2009 | Apap et al. |
| 2009/0089879 A1 | 4/2009 | Wang |
| 2009/0094697 A1 | 4/2009 | Provos et al. |
| 2009/0125976 A1 | 5/2009 | Wassermann et al. |
| 2009/0126015 A1* | 5/2009 | Monastyrsky et al. ......... 726/23 |
| 2009/0126016 A1* | 5/2009 | Sobko et al. ............... 726/23 |
| 2009/0133125 A1 | 5/2009 | Choi et al. |
| 2009/0158430 A1 | 6/2009 | Borders |
| 2009/0193293 A1* | 7/2009 | Stolfo et al. ............... 714/26 |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0017546 A1 | 1/2010 | Poo et al. |
| 2010/0043073 A1 | 2/2010 | Kuwamura |
| 2010/0054278 A1 | 3/2010 | Stolfo et al. |
| 2010/0058474 A1* | 3/2010 | Hicks ............... 726/24 |
| 2010/0077481 A1 | 3/2010 | Polyakov et al. |
| 2010/0083376 A1 | 4/2010 | Pereira |
| 2010/0100718 A1 | 4/2010 | Srinivasan |
| 2010/0115621 A1 | 5/2010 | Staniford et al. |
| 2010/0132038 A1* | 5/2010 | Zaitsev ............... 726/22 |
| 2010/0154056 A1* | 6/2010 | Smith et al. ............... 726/22 |
| 2010/0192223 A1* | 7/2010 | Ismael et al. ............... 726/22 |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2011/0041179 A1 | 2/2011 | Stahlberg |
| 2011/0047594 A1 | 2/2011 | Mahaffey et al. |
| 2011/0047620 A1 | 2/2011 | Mahaffey et al. |
| 2011/0078794 A1 | 3/2011 | Manni et al. |
| 2011/0093951 A1 | 4/2011 | Aziz |
| 2011/0099633 A1 | 4/2011 | Aziz |
| 2011/0145920 A1 | 6/2011 | Mahaffey et al. |
| 2011/0247072 A1 | 10/2011 | Staniford et al. |
| 2011/0307955 A1 | 12/2011 | Kaplan et al. |
| 2011/0314546 A1 | 12/2011 | Aziz et al. |
| 2012/0117652 A1 | 5/2012 | Manni et al. |
| 2012/0174186 A1 | 7/2012 | Aziz et al. |
| 2012/0222121 A1 | 8/2012 | Staniford et al. |
| 2012/0297489 A1 | 11/2012 | Dequevy |
| 2013/0036472 A1 | 2/2013 | Aziz |
| 2013/0227691 A1 | 8/2013 | Aziz et al. |
| 2013/0246370 A1 | 9/2013 | Bartram et al. |
| 2013/0263260 A1 | 10/2013 | Mahaffey et al. |
| 2013/0291109 A1 | 10/2013 | Staniford et al. |

FOREIGN PATENT DOCUMENTS

| | | |
|---|---|---|
| WO | 0223805 A2 | 3/2002 |
| WO | WO-2008/041950 | 4/2008 |
| WO | WO-2012/145066 | 10/2012 |

OTHER PUBLICATIONS

Goel et al., Reconstructing System State for Intrusion Analysis, Apr. 2008 SIGOPS Operating Systems Review , vol. 42 Issue 3, pp. 21-28.*

Silicon Defense, "Worm Containment in the Internal Network", Mar. 2003, pp. 1-25.

Nojiri, D. et al., "Cooperative Response Strategies for Large Scale Attack Mitigation", DARPA Information Survivability Conference and Exposition, Apr. 22-24, 2003, vol. 1, pp. 293-302.

(56) References Cited

OTHER PUBLICATIONS

Moore, D. et al., "Internet Quarantine: Requirements for Containing Self-Propagating Code", INFOCOM, Mar. 30-Apr. 3, 2003, vol. 3, pp. 1901-1910.

Williamson, Matthew M., "Throttling Viruses: Restricting Propagation to Defeat Malicious Mobile Code", ACSAC Conference, Dec. 2002, Las Vegas, NV, USA, pp. 1-9.

Costa, M. et al. "Vigilante: End-to-End Containment of Internet Worms," SOSP '05, Oct. 23-26, 2005, Association for Computing Machinery, Inc., Brighton U.K.

Chaudet, C. et al. "Optimal Positioning of Active and Passive Monitoring Devices," International Conference on Emerging Networking Experiments and Technologies, Proceedings of the 2005 ACM Conference on Emerging Network Experiment and Technology, Oct. 2005, pp. 71-82, CoNEXT '05, Toulousse, France.

Crandall, J.R. et al., "Minos:Control Data Attack Prevention Orthognal to Memory Model," 37th International Symposium on Microarchitecture, Dec. 2004, Portland, Oregon.

Kim, H. et al., "Autograph: Toward Automated, Distributed Worm Signature Detection," Proceedings of the 13th Usenix Security Symposium (Security 2004), Aug. 2004, pp. 271-286, San Diego.

Kreibich, J. et al., "Honeycomb—Creating Intrusion Detection Signatures Using Honeypots" 2nd Workshop on Hot Topics in Networks (HotNets-11), 2003, Boston, USA.

Newsome, J. et al., "Polygraph: Automatically Generating Signatures for Polymorphic Worms," In Proceedings of the IEEE Symposium on Security and Privacy, May 2005.

Newsome, J. et al., "Dynamic Taint Analysis for Automatic Detection, Analysis, and Signature Generation of Exploits on Commodity Software," In Proceedings of the 12th Annual Network and Distributed System Security, Symposium (NDSS '05), Feb. 2005.

Singh, S. et al., "Automated Worm Fingerprinting," Proceedings of the ACM/USENIX Symposium on Operating System Design and Implementation, Dec. 2004, San Francisco, California.

Margolis, P.E., "Computer & Internet Dictionary 3rd Edition," ISBN 0375603519, Dec. 1998.

Whyte et al. "DNS-Based Detection of Scannin Works in an Enterprise Network," Proceedings of the 12th Annual Network and Distributed System Security Symposium, Feb. 2005. 15 pages.

Kristoff, J. "Botnets, Detection and Mitigation: DNS-Based Techniques," NU Security Day 2005, 23 pages.

Bayer et al., "Dynamic Analysis of Malicious Code," J Comput Virol, 2006, pp. 67-77, Springer-Verlag, France.

Distler, "Malware Analysis: An Introduction," SANS Institute InfoSec Reading Room, 2007, SANS Institute.

Cohen, "PyFlag—An advanced network forensic framework," Digital investigation 5, 2008, pp. S112-S120, Elsevier.

Cohen, M.I., "PyFlag—An advanced network forensic framework," Digital investigation 5, 2008, pp. S114-S115, Elsevier.

(IN)Secure, Oct. 2008, Issue 18.

Hjelmvik, Erik, "Passive Network Security Analysis with NetworkMiner," (IN)Secure, Oct. 2008, pp. 18-21, Issue 18.

IEEE Xplore Digital Library Sear Results for "detection of unknown computer worms". Http//ieeexplore.ieee.org/searchresult. jsp?SortField=Score&SortOrder=desc&ResultC . . . , (Accessed on Aug. 28, 2009).

AltaVista Advanced Search Results. "Event Orchestrator". Http://www.altavista.com/web/results?Itag=ody&pg=aq& aqmode=aqa=Event+Orchesrator . . . , (Accessed on Sep. 3, 2009).

AltaVista Advanced Search Results. "attack vector identifier". Http://www.altavista.com/web/results?Itag=ody&pg=aq& aqmode=aqa=Event+Orchestrator . . . , (Accessed on Sep. 15, 2009).

International Search Report and Written Opinion of the International Searching Authority Dated May 10, 2012; International Application No. PCT/US 12/21916.

International Search Report and Written Opinion of the International Searching Authority Dated May 25, 2012; International Application No. PCT/US 12/26402.

Cisco, Configuring the Catalyst Switched Port Analyzer (SPAN) ("Cisco"), (1992-2003 Cisco Systems).

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Excerpt regarding First Printing Date for Merike Kaeo, Designing Network Security ("Kaeo"), (Copyright 2005).

The Sniffers's Guide to Raw Traffic available at: yuba.stanford.edu/~casado/pcap/section1.html, (Jan. 6, 2014).

"Network Security: NetDetector—Network Intrusion Forensic System (NIFS) Whitepaper", ("NetDetector Whitepaper"), (Copyright 2003).

"Packet", *Microsoft Computer Dictionary, Microsoft Press*, (Mar. 2002), 1 page.

"When Virtual is Better Than Real", *IEEEXplore Digital Library*, available at, http://ieeexplore.ieee.org/xpl/articleDetails.jsp?reload=true&arnumber=990073, (Dec. 7, 2013).

Adetoye, Adedayo , et al., "Network Intrusion Detection & Response System", ("Adetoye"), (Sep. 2003).

Baecher, "The Nepenthes Platform: An Efficient Approach to collect Malware", Springer-verlag Berlin Heidelberg, (2006), pp. 165-184.

Boubalos, Chris , "extracting syslog data out of raw pcap dumps, seclists.org, Honeypots mailing list archives", available at http://seclists.org/honeypots/2003/q2/319 ("Boubalos"), Jun. 5, 2003).

Dunlap, George W., et al., "ReVirt: Enabling Intrusion Analysis through Virtual-Machine Logging and Replay", *Proceeding of the 5th Symposium on Operating Systems Design and Implementation, USENX Association*, ("Dunlap"), (Dec. 9, 2002).

Kaeo, Merike , "Designing Network Security", ("Kaeo"), (Nov. 2003).

King, Samuel T., et al., "Operating System Support for Virtual Machines", ("King").

Krasnyansky, Max , et al., Universal TUN/TAP driver, available at https://www.kernel.org/doc/Documentation/networking/tuntap.txt (2002) ("Krasnyansky").

Liljenstam, Michael , et al., "Simulating Realistic Network Traffic for Worm Warning System Design and Testing", Institute for Security Technology studies, Dartmouth College, ("Liljenstam"), (Oct. 27, 2003).

Marchette, David J., "Computer Intrusion Detection and Network Monitoring: A Statistical Viewpoint", ("Marchette"), (2001).

Natvig, Kurt , "SANDBOXII: Internet", *Virus Bulletin Conference*, ("Natvig"), , (Sep. 2002).

Peter M. Chen, and Brian D. Noble , "When Virtual Is Better Than Real, Department of Electrical Engineering and Computer Science", University of Michigan ("Chen").

Spitzner, Lance , "Honeypots: Tracking Hackers", ("Spizner"), (Sep. 17, 2002).

Thomas H. Ptacek, and Timothy N. Newsham "Insertion, Evasion, and Denial of Service: Eluding Network Intrusion Detection", *Secure Networks*, ("Ptacek"), (Jan. 1998).

Venezia, Paul , "NetDetector Captures Intrusions", *InfoWorld Issue 27*, ("Venezia"), (Jul. 14, 2003).

Rautiainen et al., "A look at Portable Document Format vulnerabilities", Information Security Technical Report, Elsevier Advanced Technology, Amsterdam, NL, vol. 14, No. 1, Feb. 1, 2009, pp. 30-33, XP026144094, ISSN: 1363-4127, DOI: 10.1016/J.ISTR.2009.04. 001.

Aura, Tuomas, Thomas A. Kuhn, and Michael Rose. "Scanning electronic documents for personally identifiable information." Proceedings of the 5th ACM workshop on Privacy in electronic society. ACM, 2006.

Filiol, Eric, et al. "Combinational Optimisation of Worm Propagation on an Unknown Network," International Journal of Computer Science 2.2 (2007).

Deutsch, P. and J.L. Gailly. "Zlib compressed data format specification version 3.3", RFC 1950, (1996).

Net BIOS Working Group. Protocol Standard for a NetBIOS Service on a TCP/UDP transport: Concepts and Methods. STD 19, RFC 1001, Mar. 1987.

Abdullah, et al., Visualizing Network Data for Intrusion Detection, 2005 IEEE Workshop on Information Assurance and Security, pp. 100-108.

Goel, et al., Reconstructing System State for Intrusion Analysis, Apr. 2008 SIGOPS Operating Systems Review, vol. 42 Issue 3, pp. 21-28.

\* cited by examiner

NETWORK-BASED BINARY FILE EXTRACTION AND ANALYSIS FOR MALWARE DETECTION

BACKGROUND

Presently, malicious network content (e.g., malicious software or malware) can attack various devices via a communication network. For example, malware may include any program or file that is harmful to a computer user, such as bots, computer viruses, worms, Trojan horses, adware, spyware, or any programming that gathers information about a computer user or otherwise operates without permission.

Adware refers to programs configured to direct advertisements to a computer or a particular user. In one example, adware identifies the computer and/or the user to various websites visited by a browser on the computer. The website may then use the adware to either generate pop-up advertisements or otherwise direct specific advertisements to the user's browser. Spyware refers to programs configured to collect information regarding the user, the computer, and/or a user's network habits. In one example, spyware may collect information regarding the names and types of websites that the user browses and then transmit the information to another computer. Adware and spyware are often added to the user's computer after the user browses to a website that hosts the adware and/or spyware. The user is often unaware that these programs have been added and is similarly unaware of the adware's and/or spyware's function.

Various processes and devices have been employed to prevent the problems that malicious network content can cause. For example, computers often include antivirus scanning software that scans a particular client device for viruses. Computers may also include spyware and/or adware scanning software. The scanning may be performed manually or based on a schedule specified by a user associated with the particular computer, a system administrator, and so forth. Unfortunately, by the time a virus or spyware is detected by the scanning software, some damage on the particular computer or loss of privacy may have already occurred. Additionally, it can take weeks or months for new anti-virus signatures to be manually created and for an anti-virus application to be updated. Moreover, polymorphic exploits are also an issue that limits the effectiveness of some anti-virus applications.

In some instances, malicious network content comprises a bot. A bot is a software robot configured to remotely control all or a portion of a digital device (e.g., a computer) without authorization from the digital device's legitimate owner. Bot-related activities include bot propagation, as well as attacking other computers on a network. Bots commonly propagate by scanning nodes (e.g., computers or other digital devices) available on a network to search for a vulnerable target. When a vulnerable computer is scanned, the bot may install a copy of itself. Once installed, the new bot may continue to seek other computers on a network to infect. A bot may also be propagated by a malicious website configured to exploit vulnerable computers that visit its web pages.

A bot may also, without the authority of the infected computer user, establish a command-and-control (C&C) communication channel to receive instructions. Bots may receive command-and-control communication from a centralized bot server or another infected computer (e.g., via a peer-to-peer (P2P) network established by a bot on the infected computer). When a plurality of bots (i.e., a bot net) act together, the infected computers (i.e., zombies) can perform organized attacks against one or more computers on a network, or assist those engaging in criminal enterprises. In one example, bot infected computers may be directed to flood another computer on a network with excessive traffic in a denial-of-service attack. In another example, upon receiving instructions, one or more bots may direct the infected computer to transmit spam across a network. In a third example, bots may host illegal businesses such as pharmaceutical websites that sell pharmaceuticals without a prescription.

Malicious network content may be distributed over a network via websites, e.g., servers operating on a network according to an HTTP standard. Malicious network content distributed in this manner may be actively downloaded and installed on a user's computer, without the approval or knowledge of the user, simply by accessing the website hosting the malicious network content. The website hosting the malicious network content may be referred to as a malicious web site. The malicious network content may be embedded within data associated with web pages hosted by the malicious website. For example, a web page may include JavaScript code, and malicious network content may be embedded within the JavaScript code. In this example, the malicious network content embedded within the JavaScript code may be obfuscated such that it is not apparent until the JavaScript code is executed that the JavaScript code contains malicious network content. Therefore, the malicious network content may attack or infect a user's computer before detection by antivirus software, firewalls, intrusion detection systems, or the like. Additionally, network traffic may contain malicious binary files, such as, for example, executables.

SUMMARY

Embodiments of the present invention allow for network-based binary file extraction and analysis for malware detection.

In a first claimed embodiment, a method is disclosed for network-based file analysis for malware detection. Network content is received from a network tap. A binary packet is identified in the network content. A binary file, including the binary packet, is extracted from the network content. It is determined whether the extracted binary file is detected to be malware.

In a second claimed embodiment, a system is disclosed for network-based file analysis for malware detection. The system includes a binary identification module configured to receive and identify a binary packet in network content. A binary extraction module is communicatively coupled with the binary identification module and configured to extract a binary file including the identified binary packet from the network content. A malware determination module is configured to determine whether an extracted binary file is detected to be malware.

In a third claimed embodiment, a computer-readable storage medium is disclosed that has stored thereon instructions executable by a processor to perform a method for network-based file analysis for malware detection. The method comprises receiving network content from a network tap; identifying a binary packet in the network content; extracting a binary file including the binary packet from the network content; and determining whether the extracted binary file is detected to be malware.

DETAILED DESCRIPTION

As mentioned herein, network traffic may contain malware. The malware can have the form of malicious binary files, such as, for example, executables. Embodiments according to the present technology relate to a system and method for network-based binary file extraction and analysis for malware detection.

Figure 1:
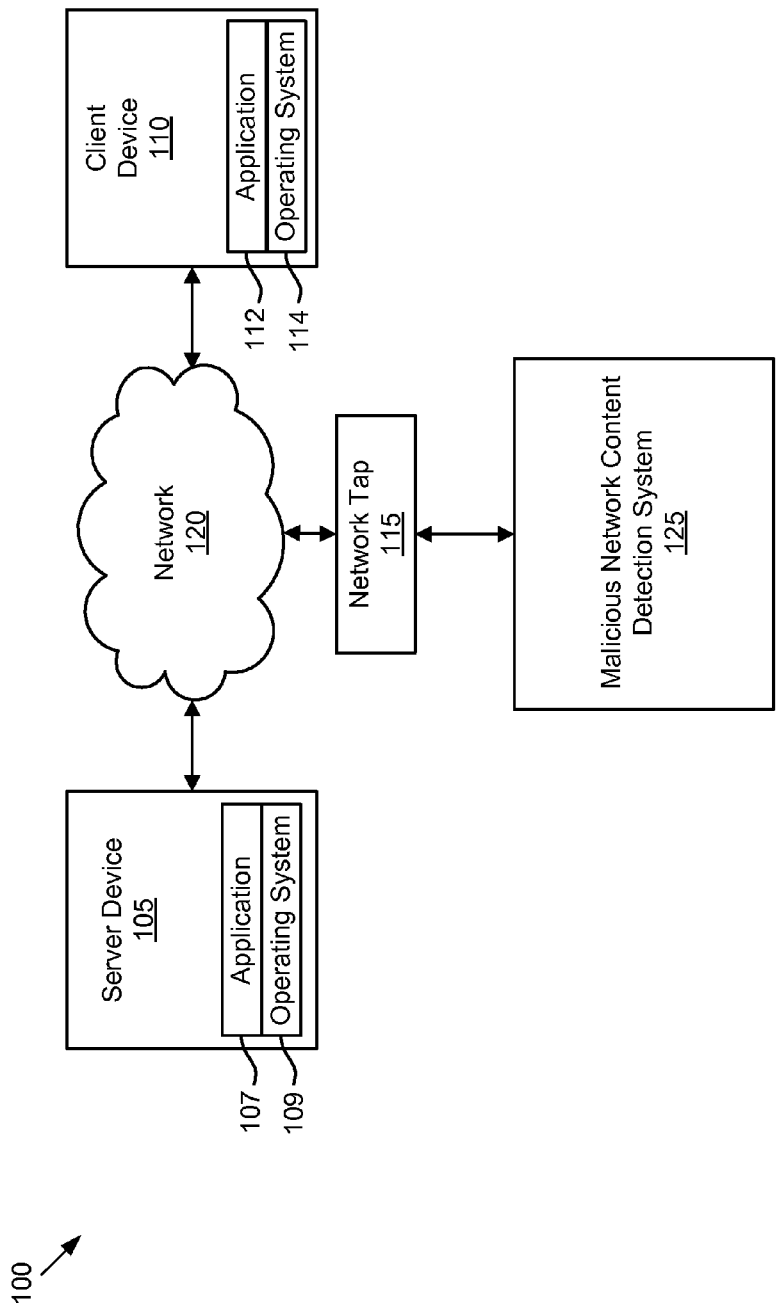
FIG. 1 is a block diagram of an exemplary malicious network content detection environment.

FIG. 1 is a block diagram of an exemplary malicious network content detection environment 100. The environment of FIG. 1 includes server device 105 and client device 110 communicating over network 120. Network tap 115 is also in communication with network 120 and may intercept communications sent over network 120, for example the communications between client device 110 and server device 105. Network tap 115 can generate a copy of the intercepted communications and provide the copied communications to malicious network content detection system 125.

Network 120 may be implemented as the Internet or other WAN, a LAN, intranet, extranet, private network, public network, combination of these, or other network or networks.

Server device 105 provides a network service over network 120. In some embodiments, when network 120 is implemented as the Internet, server 105 can provide a web service. Server device 105 may include one or more applications 107 and run an operating system (OS) 109. In some embodiments, application 107 is a web application providing a web service over network 120. Operating system 109 may be an operating system suitable for use by a server, such as WINDOWS, LINUX, or NOVEL NETWARE operating system.

Client device 110 may execute one or more client applications 112 on operating system 114. In some embodiments, one or more applications on client device 110 may utilize a service provided by server device 105 over network 120. In some embodiments, client device 110 may utilize a web service provided over network 120 by server device 105. Application 112 may be any of several types of applications, such as a browser application, instant messaging application, e-mail application, or another application which can communicate over network 120 or is affected by network content communicated to or from client device 110 over network 120. The network content may include, for example, network data, binary files, executables, etc. Operating system 114 may be any operating system suitable for a client 110, such as WINDOWS, UNIX, or any other suitable operating system.

Malicious network content detection system 125 can communicate with network tap 115 as well as server device 105 and network 120 (communication not illustrated). Network tap 115 may intercept communications between client 110 and server device 105 and communicate a copy of the intercepted communications to malicious network content detection system 125. The intercepted communications can include binary files transmitted to server device 105. Malicious network content detection system 125 can identify, extract, and analyze a binary file contained in network communications between a client device 110 and a server device 105. As part of the processing of network communications, the malicious network content detection system can detect a malicious binary and take steps to minimize the impact of the malicious binary, including initiating blocking of the communication, isolation of the binary, removal of the binary from server device 105, communication to an administrator, and other actions. Malicious network content detection system 125 is discussed in more detail below.

Figure 2:
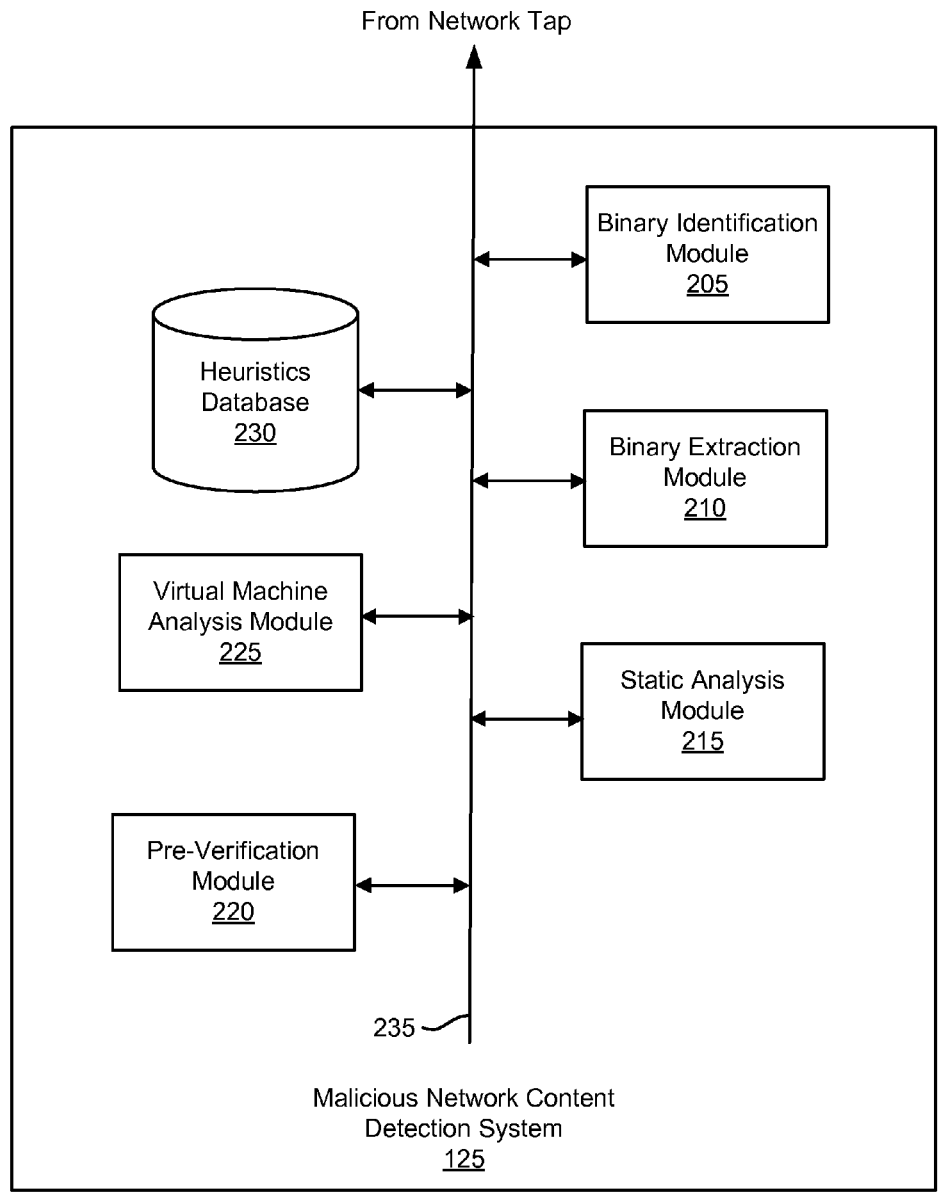
FIG. 2 is a block diagram of an exemplary malicious network content detection system.

FIG. 2 is a block diagram of an exemplary malicious network content detection system 125. Malicious network content detection system 125 includes binary identification module 205, binary extraction module 210, static analysis module 215 (or heuristics module), pre-verification module 220, virtual machine analysis module 225, and heuristics database 230. Each of modules 205, 210, 215, 220, and 225 as well as database 230 can be implemented as one or more programs executed by one or more processors on one or more servers. Each of modules 205, 210, 215, 220, and 225, as well as database 230 can be implemented at least in part hardware. Modules 205, 210, 215, 220, and 225 as well as database 230 can communicate with each other over data bus 235. Data bus 235 may be implemented as one of more general or specific data busses for communicating data, such as, for example, a memory bus, a processor bus, and so forth.

Binary identification module 205 receives network content (e.g., network traffic) via network tap 115. Binary identification module 205 is configured to identify a binary packet in the network content. Binary identification module 205 can identify binary file packets which are multi-protocol and multi-format. For example, binary identification module 205 can identify a binary packet in one of multiple protocols. These protocols can include, for example, STTP, HTTP, SMTP, TFTP, FTP, IMAP, and so forth. Similarly, binary identification module 205 can identify a binary packet in one of multiple formats. These formats can include, for example, Base64, MIME, Gzip (which is a form of compression), and so forth. Binary identification module 205 can identify a binary packet based on different portions of the packet, including packet header data. Binary identification module 205 can also identify encoded and compressed executables by decoding packets using an appropriate decoder and then determining if the decoded content is an (or portion of) executable or not.

Binary extraction module 210 is communicatively coupled with binary identification module 205 and configured to receive intercepted network content from binary identification module 205. Binary extraction module 210 extracts a binary file, which includes binary packets, from the intercepted network content. Binary extraction module 210 can extract binary file packets which are multi-protocol and multi-format. In one embodiment, the binary file extraction is performed before analyzing the binary file to determine if the binary file is detected to be malware. Analyzing the binary file to determine if the binary file is detected to be malware will be described herein.

Malicious network content detection system 125 does not only just search for a raw executable based on the executable headers. The system also searches for encoded executables by first performing decoding and then determining if the decoded content is an executable or not.

In one embodiment, extracting the binary file includes utilizing transmission control protocol (TCP) sequence numbers within the packet to position binary packets in a correct order. This is done because packets belonging to an executable often come out of order. Sometimes, packets of an executable are missing altogether. A user datagram protocol (UDP), or any other suitable protocol, can also be utilized in accordance with embodiments according to the present invention.

Static analysis module 215 is communicatively coupled with binary extraction module 210. The static analysis module 215 can receive an extracted binary (i.e., extracted executable file) from binary extraction module 210. Static analysis module 215 then applies heuristics to the received extracted executable. The heuristics can be retrieved from heuristics database 230. Static analysis module 215 is configured apply heuristics to the extracted binary file to determine if the binary file is suspicious or not. Static analysis module 215 examines heuristics and performs analysis to detect features such as obfuscation, size, etc. Static analysis module 215 is communicatively coupled with heuristics database 230. When application of the heuristics indicates that one or more data packets (such as a binary file) of the network data have a suspicious characteristic or are otherwise suspicious, static analysis module 215 may provide the suspicious binary file to pre-verification module 220.

Pre-verification module 220 can receive a suspicious binary file from static analysis module 215 and compare the binary file against a repository of information associated with known malware binary files to determine if there is a match. The information may include binary file header data, signature data, binary files, and other information. Pre-verification module 220 can compare checksums (hashes, etc.), search for patterns in the network traffic, etc., to determine if there is a match. If pre-verification module 220 detects that a binary file matches a stored malware binary file, the binary file is transmitted to virtual machine analysis module 225 for further processing. If pre-verification module 220 does not detect that a binary file matches a stored malware binary file, virtual machine analysis is then performed on the binary file by the virtual machine analysis module 225, as discussed herein.

An exemplary static analysis module 215 and heuristics database are discussed in more detail in U.S. patent application Ser. No. 12/263,971, filed on Nov. 3, 2008, titled, "Systems and Methods for Detecting Malicious Network Content," which is incorporated by reference herein in its entirety.

Virtual machine analysis module 225 is communicatively coupled with heuristics database 230 and pre-verification module 220. Virtual machine analysis module 225 receives suspicious binary files from pre-verification module 220 and processes the suspicious binary files in a virtual environment. The processing may include executing the suspicious binary files in a virtual operating system to determine if the binary files perform any undesirable actions, operations, or otherwise are determined to be malware. Virtual machine analysis module 225 is discussed in more detail below.

Figure 3:
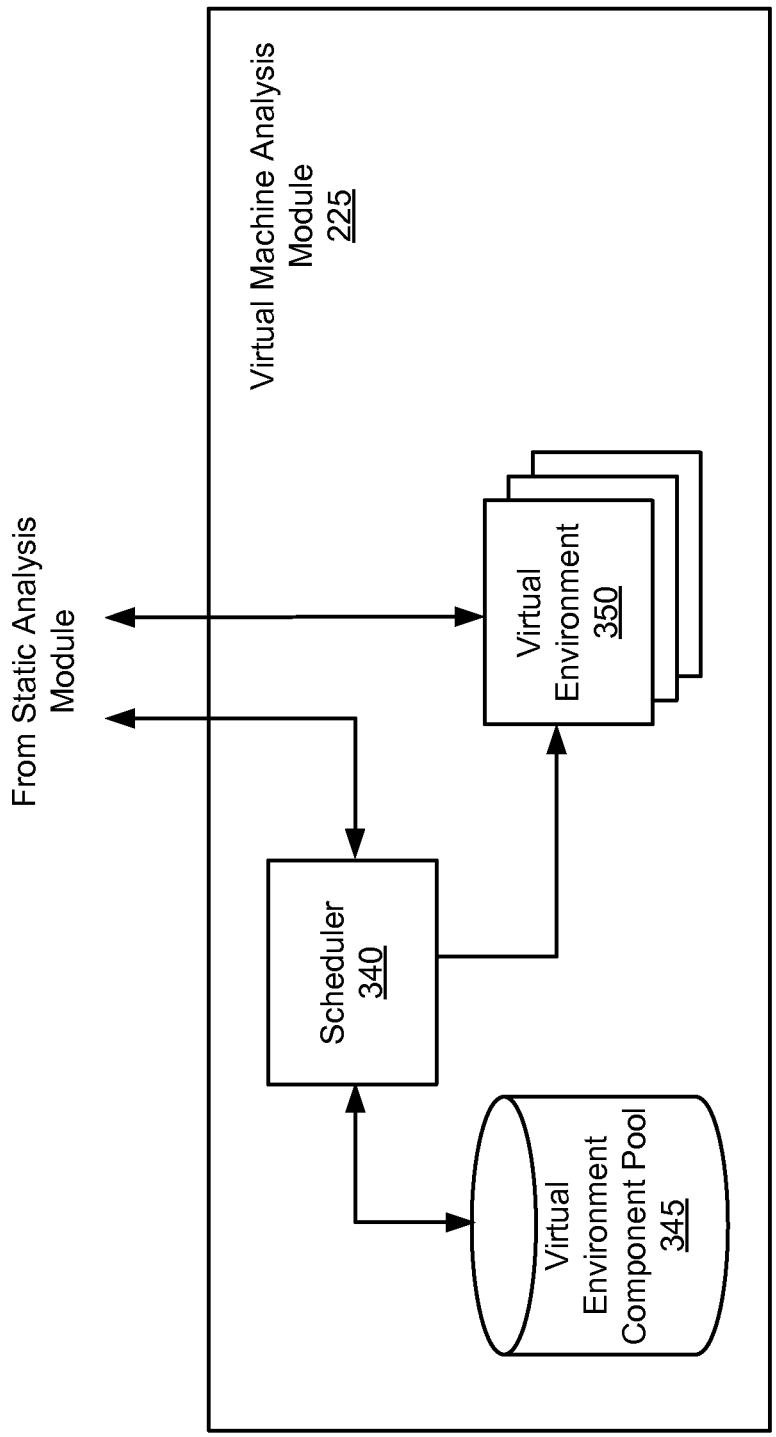
FIG. 3 is a block diagram of an exemplary virtual machine analysis module.

Referring to FIG. 3, virtual machine analysis module 225 is shown in greater detail. Scheduler 340 of virtual machine analysis module 225 can receive a suspicious binary file from static analysis module 215, via pre-verification module 220 (or via static analysis module 215 directly), and replay or execute the binary file in virtual environment 350. In some embodiments, suspicious binary files include data packets that might contain malicious network content such as executable files, for example.

In exemplary embodiments, "replay" of the suspicious network content includes processing the suspicious network content in a virtual environment 350 that is configured to mimic the real environment in which the network content was or was intended to be processed. Configuring the replay of suspicious network content can include retrieving one or more virtual environment components from virtual environment component pool 345, configuring the virtual components, providing the virtual components to virtual environment 350, and executing playback of the suspicious binary file within the virtual environment along with the configured virtual components. For example, a suspicious binary file may be configured to execute within a virtual network browser configured to run on a virtual operating system within virtual environment 350.

Virtual environment component pool 345 contains a pool of different component types, such as applications, operating systems, and other components. Virtual environment 350 is used to replay suspicious network content using one or more virtual components configured to operate virtually within the virtual environment 350. The operation of exemplary embodiments of a scheduler is discussed in more detail in U.S. patent application Ser. No. 12/263,971, filed on Nov. 3, 2008, titled, "Systems and Methods for Detecting Malicious Network Content," which is incorporated by reference herein in its entirety.

Figure 4:
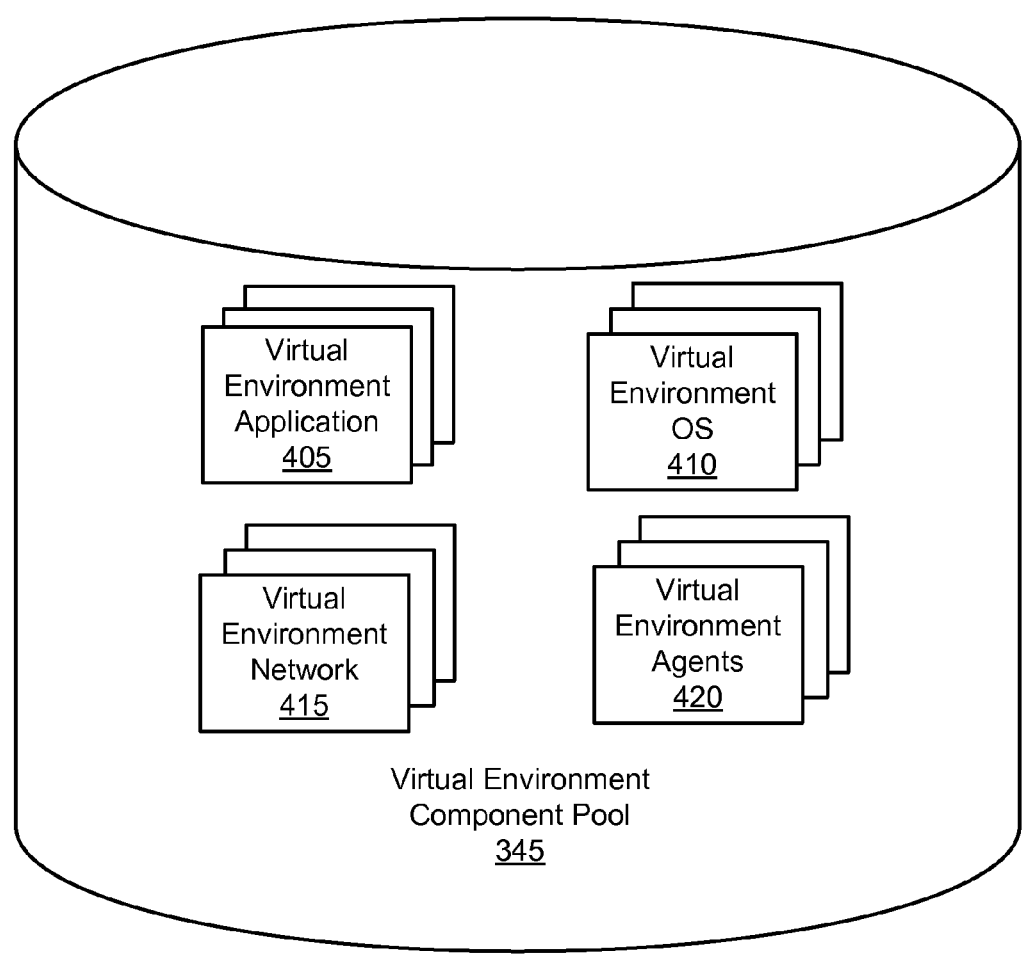
FIG. 4 is a block diagram of an exemplary virtual environment component pool.

Referring to FIG. 4, virtual environment component pool 345 includes virtual environment applications 405, virtual environment operating systems 410, virtual environment networks 415, and virtual environment agents 420. Each of virtual environment applications 405 may be configured to appear and perform as a real application which processes or is affected by network data. Examples of virtual environment applications 405 include a browser application, such as "Internet Explorer" by Microsoft Corporation or "FireFox" by Mozilla, instant messaging applications, client e-mail applications, other applications that process data communicated over a network, and other applications. The virtual environment applications 405 may be implemented as one or more templates of a type of application, or a specific instance of a particular application. The virtual environment applications 405 can be retrieved, configured, and used within one or more virtual environments 350. The behavior of the virtual environment applications 405 can be monitored and compared to an expected behavior to determine whether or not any variances exist which may indicate malicious network content and/or data.

Virtual environment operating system 410 can be implemented to appear and perform as any of several widely known operating systems for computers which process network data, for example WINDOWS, UNIX, or other operating systems. The virtual environment operating system may be configured to mimic a real operating system and monitor to detect attempted changes and actual changes to the operating system which are unexpected.

Virtual environment agent 420 can detect changes in a virtual environment component, such as a virtual environment application 405 or virtual environment operating system 410. In some embodiments, a virtual environment agent 420 may detect changes to a virtual environment component that are not made using a standard process, changes to virtual environment component settings that should not be changed, and other changes to a virtual environment component. For example, virtual environment agent 420 may detect when a change is made to an operating system setting using a non-standard process.

Virtual environment network 415 may be implemented to include a virtual switch, an intranet, the Internet, or some other network. Virtual environment network 415 is configured with protocols that mimic the real network in which the network data is communicated.

Figure 5:
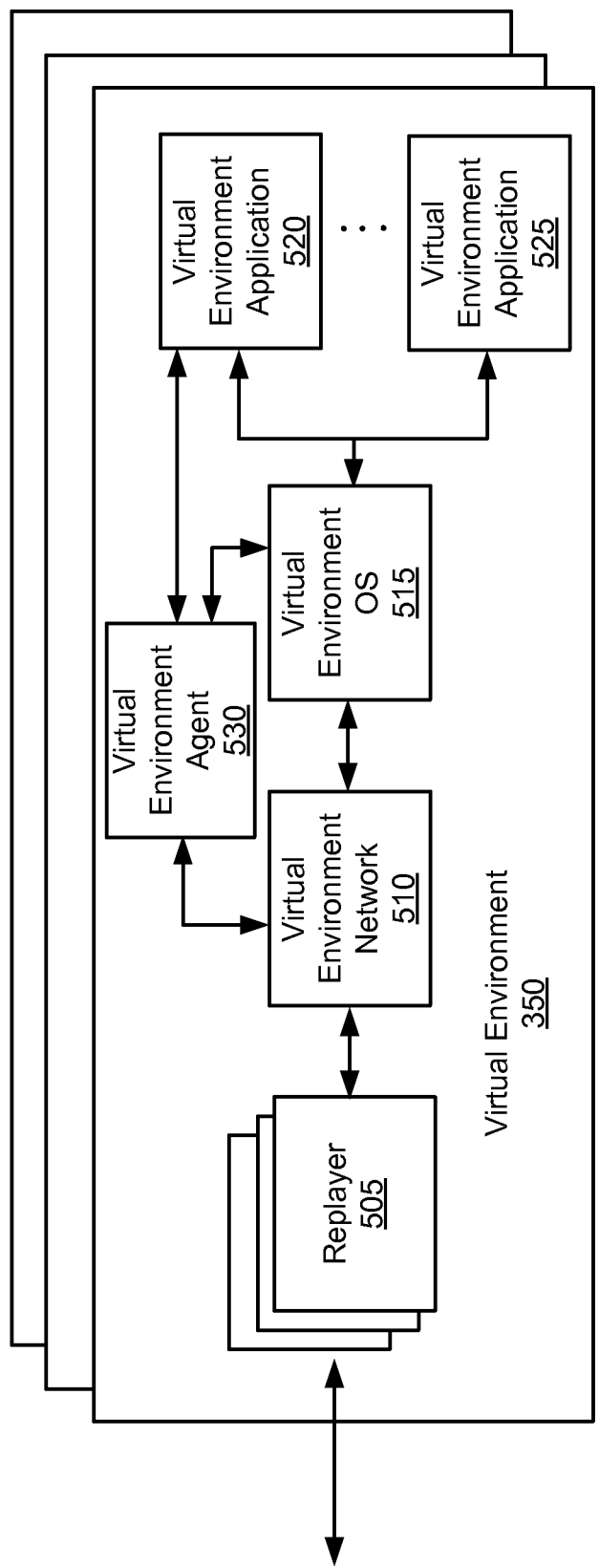
FIG. 5 is a block diagram of an exemplary virtual environment.

FIG. 5 is a block diagram of an exemplary virtual environment 350. Virtual environment 350 includes replayer 505, virtual environment network 510, virtual environment operating system 515, virtual environment applications 520-525, and virtual environment agent 530. Replayer 505 replays network content such as a suspicious binary file in the virtual environment network 510 by receiving and transmitting communications with virtual environment operating system 515 over virtual environment network 510. The communications can be processed by virtual environment operating system 515 as well as by one or more virtual environment applications 520-525.

In some embodiments, suspicious network data such as a suspicious binary file is processed by virtual environment operating system 515 and virtual environment applications 520 and/or 525. Virtual environment network 510 may receive the suspicious binary file from replayer 505 and provide the suspicious binary file to virtual environment operating system 515. Virtual operating system 515 may process the suspicious binary file and optionally provide the suspicious binary file to a virtual environment application. In some embodiments, virtual operating system 515 is configured to mimic a server or server applications, such as server device 105, application 107 or operating system 109.

Virtual environment network 510 may be retrieved from virtual environment component pool 345. The virtual environment network 510 may be implemented as a program to implement a switch or a gateway, or some other software implementation of a network which mimics an actual communications network. In some embodiments, the virtual environment network 510 may process and implement the transmission of data in a manner that simulates the processing and transmission of data by an actual network. In some embodiments, the communications processed through virtual environment network 510 are monitored. In some embodiments, implementing a virtual environment network 510 is optional, in which case replayer 505 communicates with virtual environment operating system 515 directly.

Virtual environment operating system 515 is configured to mimic (e.g., appear and perform in a similar manner as) a real operating system, for example, operating system 114 for client device 110 that processes data over network 120. In some embodiments, virtual environment operating system 515 is implemented as code that emulates an operating system and can interact with one or more virtual environment applications as an actual operating system would. In some embodiments, the virtual environment operating system is implemented as an actual operating system executing within a virtual environment 350.

Virtual environment operating system 515 may communicate data between virtual environment network 510 (or replayer 505) and one or more virtual environment applications. For example, virtual environment operating system 515 may receive requests from a virtual environment application, route the request to replayer 505, and route response data, for example suspicious network content data, from replayer 505 to virtual environment application 520 or 525, respectively. In some embodiments, communications, settings, and other parameters aspects of the behavior of virtual environment operating system 515 within virtual environment 350 are monitored. In some embodiments, virtual environment operating system 515 is optional.

Virtual environment applications 520 and 525 are each configured to behave as an application that processes or is affected by network content on a client computer or server. For example, a virtual environment application may be implemented as code that emulates a real application to mimic the behavior of the real application, for example the behavior of application 112 on client device 110. In some embodiments, a virtual environment application may be implemented as a copy of the actual application which is executed within the virtual environment.

Virtual environment applications can be configured and controlled to replicate the processing of suspicious content data. For example, when replaying suspicious content data, such as a binary executable for example, the virtual environment application can be controlled to submit a request for data over a virtual network. At least a portion of the suspicious content data is transmitted to the virtual environment application in response to the request. Replay of suspicious network data continues until the content data has been replayed in its entirety. The communications, settings, and other aspects of the behavior of virtual environment applications within virtual environment 350 can be monitored.

One or more virtual environment agents 530 can be configured to monitor the behavior and/or state of one or more virtual environment components. In some embodiments, virtual environment component behavior can include requests for data, sending or receiving data over a network, processing and/or storing data, or other operations performed on the component. In some embodiments, the virtual environment component state may include a "snapshot" of the virtual environment parameters and settings, for example values for components settings, status of a portion component portion (i.e., error conditions, interrupts, availability of a buffer), or values for settings or parameters for the component. For example, virtual environment agent 530 can monitor changes made to virtual environment operating system 515. In some embodiments, if a setting is changed to an improper value or an improper procedure is used to change a setting to the operating system, the virtual environment agent 530 can detect the code associated with suspicious network content which performed the change.

In addition to the network, operating system, application, and agent components illustrated in virtual environment 350, other types of virtual environment components can be used within virtual environment 350 to process suspicious network data. For example, virtual environment 350 may include virtual environment hardware to mimic a hardware protocol, ports, or other behavior of an actual hardware machine.

Exemplary methods discussed herein relate to detecting and processing malicious network content. Examples are occasionally discussed which relate to virtual environment components comprising a browser application and an operating system. These exemplary references are for purposes of discussion only and are not intended to limit the scope of the present technology.

Figure 6:
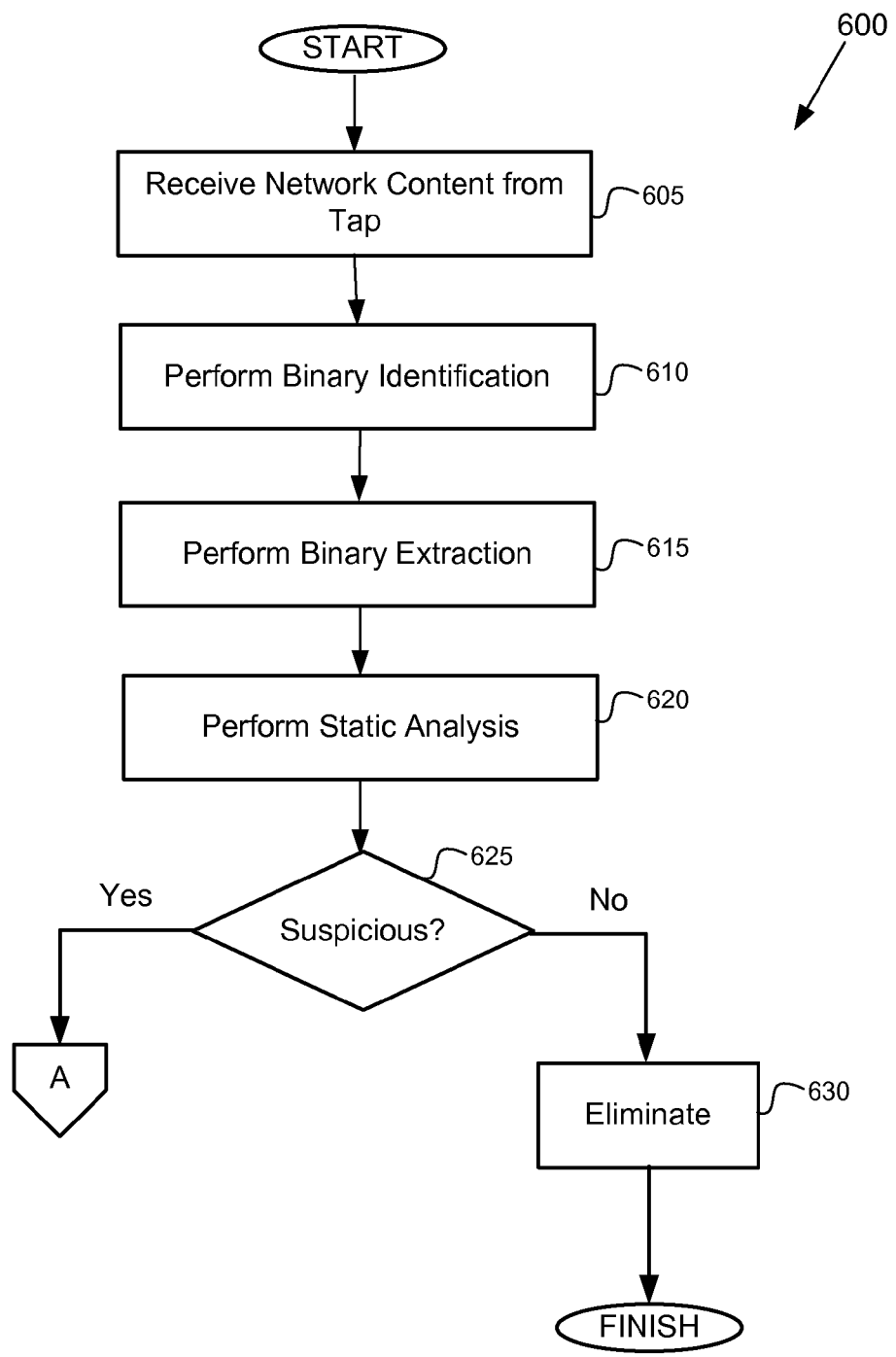
FIG. 6 is a flowchart of an exemplary method for network-based file analysis for malware detection.

FIG. 6 is a flow chart 600 of an exemplary method for network-based file analysis for malware detection. In step 605, malicious network content detection system 125 receives network content (e.g., network traffic) from network 120 via network tap 115. More specifically, in one embodiment, binary identification module 205 receives a copy of network content from network tap 115.

In step 610, binary identification module 205 identifies a binary packet in the network content. As mentioned herein, binary identification module 205 can identify a binary packet in multiple protocols and multiple formats. In some embodiments, several binary packets may be identified at step 610, each of which is forwarded to binary extraction module 210.

In step 615, binary extraction module 210 receives intercepted network content from binary identification module 205. Binary extraction module 210 extracts a binary file, which includes binary packets, from the network content identified as one or more binary packets by binary identification module 205. Binary extraction module 210 can extract binary file packets which are multi-protocol and multi-format.

However, data packets are often encountered out of order. Furthermore, all of the data packets of a given executable might not arrive in an unbroken chain. In other words, data packets that are not part of the executable in question might intervene. Data packets can also be missing altogether. Binary extraction module 210 can use, for example, TCP sequence numbers in order to put binary packets in a correct order until a binary file is constructed and thus extracted. In other words, binary extraction module 210 may remove the identified packets and place them into a binary file in the order they were intended.

In step 620, static analysis is performed on the binary file which comprises one or more extracted binary packets. Static analysis module 215 receives an extracted binary file from binary extraction module 210. Static analysis module 215 then applies heuristics to the binary file to determine if the binary file is suspicious. Static analysis module 215 searches for indicia such as obfuscation, size, etc. Static analysis module 215 accesses heuristics data from heuristics database 230 to facilitate the analysis.

Figure 7:
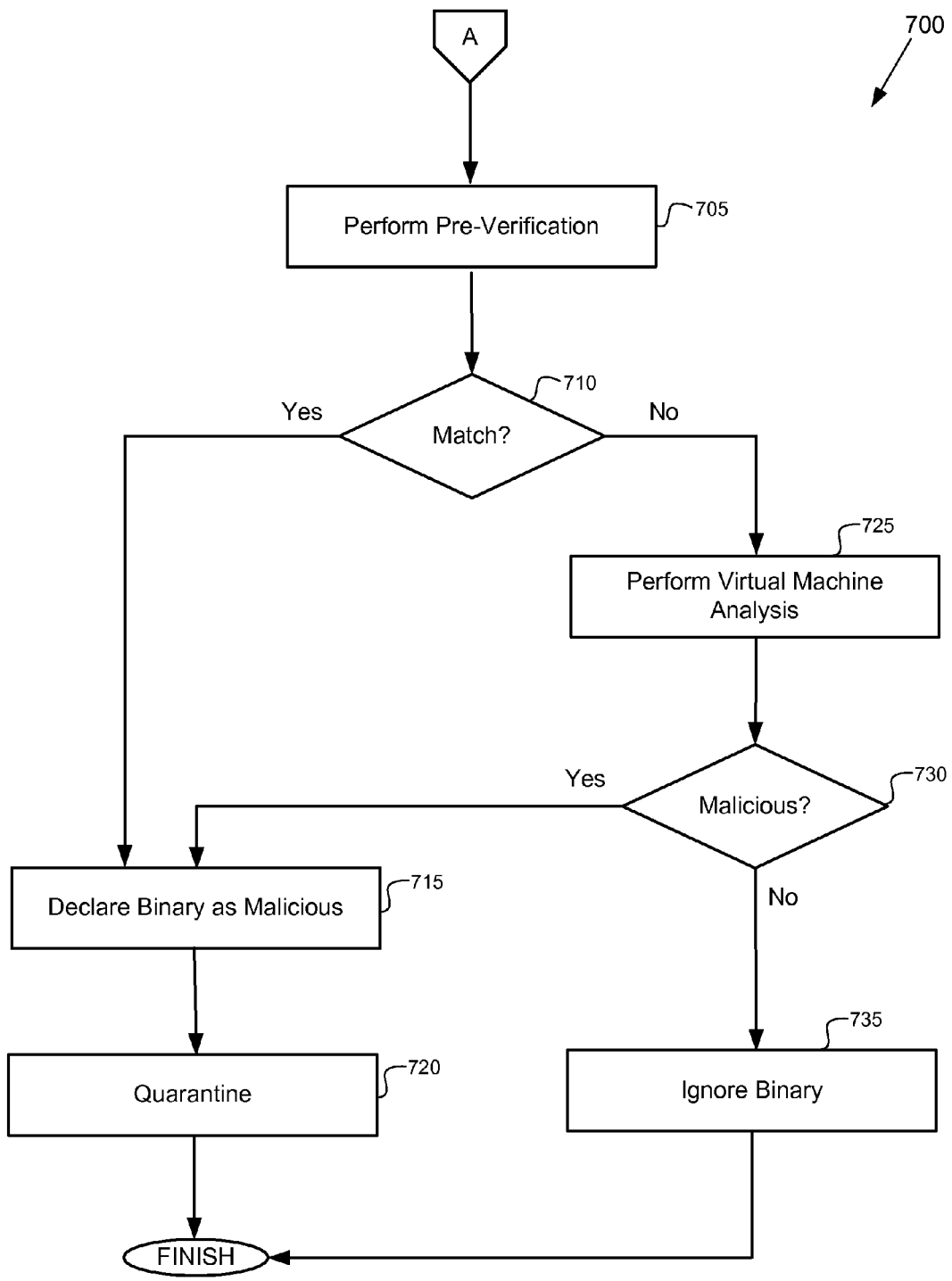
FIG. 7 is a flowchart of an exemplary method for network-based file analysis for malware detection.

In step 625, when examination of the heuristics indicates that one or more binary data packets (one or more packets from the extracted binary file) of the network data have a suspicious characteristic or are otherwise suspicious, static analysis module 215 provides the suspicious binary file to pre-verification module 220 and the process proceeds to step 705 of FIG. 7.

If the binary file does not appear to be suspicious, then the process proceeds to step 630. In step 630, the binary file is eliminated as possible malware. Static analysis module 215 performs a pre-evaluation process to identify suspicious packets and binary files having suspicious packets which require more in-depth processing while eliminating binary files and packets that do not need to be analyzed further. By eliminating packets and binary files that do not need to by analyzed further, the static analysis module 215 saves processing cycles when compared to prior art methods that completely analyze all binary packets and files.

Referring to FIG. 7, a flowchart 700 is depicted of an exemplary method for network-based file analysis for malware detection. In step 705, pre-verification is performed by pre-verification module 220. In this phase, the suspicious binary file identified by static analysis module 215 is compared to binary files contained in a pre-verification database (not depicted) of known malicious binary files to determine if there is a match for the suspicious binary file. Various techniques can be utilized to determine a match, such as calculating checksums, searching for patterns, etc. The pre-verification database can be located within malicious network content detection system 125. In one embodiment, the pre-verification database is a standalone database. However, it is also contemplated that the pre-verification database can be a part of pre-verification module 220, part of one of the other modules, or part of heuristics database 235. In step 710, if there the pre-verification database includes a match for the suspicious binary file, the process proceeds to step 715. If there is no match then the process proceeds to step 725.

In step 715, it has been determined that the binary file matches with known malware, and the binary file is declared as malicious. In step 720, the binary file is placed under quarantine. In this step, the binary file is isolated from client device 110 so that the binary file cannot inflict any damage. Other actions can also be performed based on the determination that the suspicious malware is actually malware.

In step 725, the binary file is received by virtual machine analysis module 225. Virtual machine analysis is then performed on the binary file by the virtual machine analysis module 225, as discussed herein, in order to determine if the binary file in question is malicious. Various behavior and activities of the binary file within a configured virtual environment are monitored in order to detect any suspicious behavior or activity. The monitoring can include attempted CPU instrumentation by the suspicious binary file, network behavior anomalies, network pattern matches, operating system behavior, data theft, key logging, startup, file registry process, code injection, changes to files, changes to registry keys, changes to processes, processes trying to launch themselves, initiation of processes trying to "hook" themselves into the startup mechanisms of an operating system, such as a WINDOWS operating system, so that on reboot the suspicious binary file will start automatically, processes trying to perform actions such as kill firewalls or kill anti-virus software to protect themselves, and so forth.

Suspicious network content can be detected by static analysis module 215 as static analysis module 215 applies heuristics to the network content provided by binary extraction module 210. For example, if a heuristic applied by static analysis module 215 identifies a suspicious characteristic in the network content, then the network content is considered suspicious. Exemplary methods for detecting suspicious network content using heuristics and other methods are disclosed in U.S. patent application Ser. No. 12/263,971, filed on Nov. 3, 2008, titled, "Systems and Methods for Detecting Malicious Network Content," which is incorporated by reference herein in its entirety.

The suspicious network content may include data packets containing suspicious characteristics as well as related data packets. For example, suspicious network content may include data packets comprising the request which resulted in a response having a suspicious characteristic as well as additional data retrieved by the code containing the suspicious characteristic. The suspicious network content may include binary files and/or executables.

Suspicious network content is replayed using the virtual environment components. The suspicious network content is replayed within virtual environment 350 by replayer 505. In some embodiments, replaying virtual network content includes processing the suspicious network data by one or more virtual environment components within virtual environment 350. For example with respect to web page content having suspicious content, replayer 505 transmits the suspicious network content containing the suspicious characteristic to be processed by a virtual environment operating system and virtual environment browser application. The actual network content copied is provided to the one or more of the virtual environment components.

After replaying the suspicious network content, the virtual environment components are analyzed to detect malicious network content. In some embodiments, each virtual environment component is associated with an expected behavior. The expected behavior for a component is compared to the behavior observed for the virtual environment component as the component processed the suspicious network content. If there was a difference between the observed behavior and the expected behavior, the suspicious network content is determined to be malicious network content.

After detecting malicious network content, the malicious network content is identified and processed. In some embodiments, an identifier is created for the malicious network content and further processing is performed to minimize damage resulting from the malicious network content. The further processing may include blocking subsequent network data that resembles the identified malicious network content, removing the malicious network content from one or more clients within a computer network, and other processing.

An exemplary method for configuring virtual environment components includes identifying components in a live environment. The components may be identified on client device 110, server device 105, or some other machine (real or virtual) or environment that processes or is affected by network data communicated over network 120. The identification can be performed by scheduler 340 based on information in network data, a reporting server with information for one or more computers exposed to the network content (e.g., computers that transmit or receive the suspicious content), data stored locally on malicious network content detection system 125, or from some other source. Examples of real environment components include a browser application, electronic messaging client, instant messaging client, an operating system, some other software or hardware on a machine that accesses network content, etc.

Scheduler 340 performs various tasks, as described herein. Virtual environment components are retrieved for the identified real environment components by scheduler 340. The virtual environment component can be associated with types of applications, operating systems, or other code that can be executed in a real environment. The components can be retrieved by scheduler 340 from virtual environment component pool 345.

The one or more virtual environment components may be configured to mimic a real environment application at. Scheduler 340 can configure the component to mimic the appearance and behavior of the real environment application. The configuration can be such that any suspicious code will not be able to detect a difference between the real component and the virtual environment component application. For example, a virtual environment network application 415 can be configured as Microsoft's "Internet Explorer" or Mozilla's "Firefox" browser application, wherein the component is configured with protocols, user preferences, proxy addresses, encryption preferences, add-in code, and other settings that can correspond to an actual browser application executing on client device 110.

In some embodiments, rather than execute code that mimics the application, a copy of the actual application is executed within the virtual environment. Thus, the application is executed within a virtual operating system, configured with settings and parameters associated with a real application.

Virtual environment components can be configured to mimic a real environment operating system. The virtual environment operating system may be configured to mimic an operating system used to process network data communicated over network 120 by server device 105 or client device 110. For example, the component can be configured to mimic Microsoft's "Windows" operating system. The configuration may include setting a number of port addresses, settings, and other data.

Virtual environment components may then be configured to mimic the real environment network. Configuring a virtual environment component network may involve setting up protocols, and other features to mimic network 120. In some embodiments, the network may be configured as a virtual switch, relay station, or some other network system for relaying content data.

Virtual environment agents are retrieved and configured. A virtual environment agent can be implemented as code which monitors component behavior and settings in a virtual environment. The virtual environment agents may detect behaviors and changed settings as they occur and may detect whether the behaviors or setting changes are expected or unexpected. If unexpected, the suspicious network content which implemented or caused the change is identified as malicious.

In some embodiments, a virtual machine hardware component may be configured as well. In this case, the virtual machine hardware may be configured to mimic real hardware ports, settings, and other aspects of the actual hardware used to implement an operating system and application components.

An example regarding replaying network content using a browser application is considered herein. An initial request is replayed from a virtual environment application to a virtual environment operating system. In some embodiments, the initial request is configured based on network content (for example, consisting of network data packets) copied by network tap 115. For example, network content may be stored for period of time. When one or more network content data packets are determined to be suspicious, all network content associated with the suspicious data packets are retrieved and replayed. For example, network content provided to a network browser application in response to a request may contain suspicious data packets. Once data packets in the response are determined to be suspicious, the request which generated the response as well as other communications occurring after the response was received all retrieved in their entirety.

In some embodiments, the initial request is configured by replayer 505 or scheduler 340 and sent from virtual environment application 520 to replayer 505. Transmission of the initial request can result in virtual environment application behavior corresponding to the request. For example, for a network browser application, the request may initiate creating of a cookie associated with the request. The cookie can include a timestamp for and an identifier associated with the request, as well as creation of other data.

Suspicious network content is provided to a requesting virtual environment application. In response to the initial request, the network content is transmitted to the virtual environment application to replicate transmission of the network content to the requesting client in a real computing environment. For example, in reply to an HTTP request, the response may include HTTP packets, image data packets, and other content comprising a response to the request. The data packets comprising the response are transmitted to virtual operating system 515 by replayer 505 over virtual environment network 510. Virtual operating system 515 receives the content data, optionally processes the data, determines which virtual environment application will receive the data, and "transmits" the content data to the virtual environment application. For a virtual network browser application, the content data is transmitted to the browser application to be loaded as a web page or other content.

In some embodiments, the network content is not provided to a virtual environment operating system, but rather directly to the virtual environment application.

The suspicious network content is then processed by the virtual environment application. For example, a virtual environment browser application may load web page data and image data, execute a script, or provide flash video as included in the response data packets.

When the received network content contains code that is malicious (although it may not yet be identified as malicious before it is executed), the content is processed by the virtual environment application just as it would be when the network content and malicious code would be executed by a real application. For example, malicious content may include binary code that includes an executable. When executed by the virtual environment browser application, the executable code may attempt to transmit a message to a server, retrieve data within the local environment, change a setting in the virtual environment browser application, or perform some other operation as mentioned herein.

While processing the suspicious network content, the virtual environment application, operating system, network and other virtual environment components are monitored by one or more virtual environment agents 530. As suspicious network data is "replayed" by processing the network data by the virtual environment components, the behavior of each component can be detected, logged, stored, reported and/or otherwise monitored by an agent. One agent may monitor a single component or multiple components.

For example, a virtual environment agent may detect behavior in a virtual environment browser application. When the virtual environment browser receives and processes suspicious content data, the browser application may execute executable code within the data. The executable code may attempt to transmit a message over the virtual network (i.e., to replayer 505) improperly. For example, the executable may attempt to send a message directly to a server instead of using a proxy address specified by the virtual environment browser application. A virtual environment agent monitoring the browser application may detect all requests sent by the virtual browser application, and thereby detect the improper request which did not go to the proxy address.

A virtual environment agent may also detect changes to an operating system which are improper. For example, when executed by a virtual environment application, an executable or other code in received network content may change or attempt to change an operating system setting, value, or otherwise change the virtual environment operating system. The virtual environment agent may detect the change or attempted change by intercepting or monitoring all changes to the virtual environment operating system. As another example, the operating system may receive data to be stored. The data may comprise an executable, which may attempt to access information, control an application, or perform some other function. When data received by the operating system for storage is an executable or other executable code, the execution of the data is monitored by the agent to determine the effects of the data execution.

When monitoring data, a virtual environment agent may record information regarding the effects and identification of the suspicious network data when the data is being processed in the virtual environment. For example, the virtual environment agent may identify application and operating system settings and values affected by the suspicious network content, values before and after they are affected during processing of the suspicious network content, changes to processes such as an operating system "start-up" process, and other changes. The virtual environment agent may also identify a request made by the suspicious network content, including requests to transmit data over a network, requests for local data access, and other requests. This and other data may be stored and/or reported by the virtual environment agent for later processing.

Analyzing virtual environment components to detect malicious network content can be performed by scheduler 340. In one embodiment, expected behavior for a virtual environment component such as an application, operating system and/or network is accessed. The expected behavior data can be determined from stored behavior patterns associated with each component. The behavior patterns may be accessed locally or remotely by scheduler 340. For example, a stored behavior pattern for a virtual environment network browser can indicate that all requests to transmit over a network should be directed towards a proxy address specified by the virtual environment network browser. A stored behavior pattern for an operating system can indicate parameter values that should not be changed as well as code that should be invoked when attempting to change a particular parameter.

The actual behavior pattern of the virtual environment application or operating system is then compared with the expected behavior pattern for the application or operating system. The actual behavior may be retrieved from data stored by one or more virtual environment agents 530. For example, the expected behavior for transmitting a request by a virtual environment network browser can include sending a content request to a proxy address set within the network browser settings. The actual behavior may include a content request initiated by executable binary code in the suspicious network content that attempts to transmit a network request directly.

If a difference is detected between the actual behavior and expected behavior then the suspicious network content is identified and processed as malicious network content. In some embodiments, the suspicious network data is flagged to be identified and processed later.

After identifying and processing the malicious network content, or if no difference is detected between the actual behavior and expected behavior, the actual behavior for a virtual environment operating system is compared to the expected behavior for the virtual environment operating system. For example, the expected behavior may involve a particular process changing an operating system parameter value, when the actual behavior may attempt to change the operating system parameter value without using the particular process. The actual behavior may involve an attempt to change the settings by code executed by an application. If any difference is detected between the actual behavior and the expected behavior for the virtual environment operating system, the suspicious network data associated with the actual behavior is identified and processed as malicious network content.

The actual behavior is compared with expected behavior for a virtual environment network. If any difference is detected between the actual behavior and the expected behavior, the network data associated with the behavior is identified and processed as malicious network content. If no difference is detected, the suspicious network data is not identified as malicious network content.

In some embodiments, scheduler 340 can detect malicious content from the behavior of a virtual environment application, virtual environment operating system, or virtual environment network "on the fly" or instantly during replay of the suspicious content in the virtual environment rather than waiting until suspicious content replay has been completed. As suspicious content is replayed, scheduler 340 may compare each incremental behavior of a virtual environment application, operating system, or network to the corresponding next expected incremental behavior. If the next actual incremental behavior does not match the next expected incremental behavior, the suspicious content responsible for the actual behavior is immediately identified as malicious network content and the malicious network content is processed. By comparing the expected behavior and actual behavior during replay rather than after replay has completed, malicious network content can be identified during the replay of the suspicious content (i.e., "on the fly") and subsequent occurrences of the malicious network content can be detected more quickly.

More detail regarding identifying and processing malicious network content is described herein. First, an identifier is created for malicious network content. The identifier may be generated at least in part based on information within the malicious network data.

Network content data associated with malicious network content is then collected. The collected network content data associated with the malicious network content may include the data packets that include the identified malicious network content, code retrieved by the malicious network content, source information that provided the malicious network content, and other data.

After collecting network content data, a heuristic is generated to identify the subsequent malicious network content associated with the malicious content data. The heuristic is generated such that it may identify network data copied and provided by network tap 115. In some embodiments, the heuristic is a signature of the network content data. In some embodiments, the signature can include or be derived from data packets comprising the malicious network data, an identification of the application that processed the malicious data, a byte sequence of the malicious data, and other data that is capable of identifying the malicious network data within a stream of network data received over a network.

The generated heuristic is then provided to static analysis module 215 within malicious network content detection system 125. Once provided to static analysis module 215, the static analysis module 215 may apply the heuristic to network data retrieved by network tap 115 and provided to malicious network content detection system 125.

In some embodiments, a signature may be generated immediately upon detecting the malicious network content, such that the signature can be applied to subsequent network content with minimal delay. Generating and applying the signature immediately against subsequent network content enables the present system to provide real-time detection and protection against malicious network content. For example, if a virtual environment agent 420 detects that network content improperly changes a virtual environment operating system setting, the agent, scheduler, or heuristic module (or a combination of these) may generate a signature for the corresponding network content. The heuristic module may then apply the signature to subsequent network traffic copied by network tap 115. If any network content in subsequent network traffic matches the signature, the subsequent network traffic can be blocked or otherwise contained without affecting client device 110.

In addition to providing heuristics against subsequent or future malicious network content, measures may be taken to remove the malicious network content from computing systems which have already been infected by the content. Script code is created for disinfecting live environment components. The script code is generated for the purpose of restoring a real environment component from damage caused by the malicious network content. The created script code is then distributed and executed among computers suspected of receiving the malicious network content.

Virtual environment components and the like are discussed in more detail in U.S. patent application Ser. No. 12/359,252, filed on Jan. 23, 2009, titled, "Detecting Malicious Network Content Using Virtual Environment Components," which is incorporated by reference herein in its entirety.

In step 730, a determination is made as to whether the binary file has been detected to be malicious (e.g., malware).

If the binary file has been detected to be malicious then the process proceeds to step 715. If the binary file has not been detected to be malicious then the process proceeds to step 735. In step 735, the binary file is ignored since a determination has been made that it is not malicious.

Figure 8:
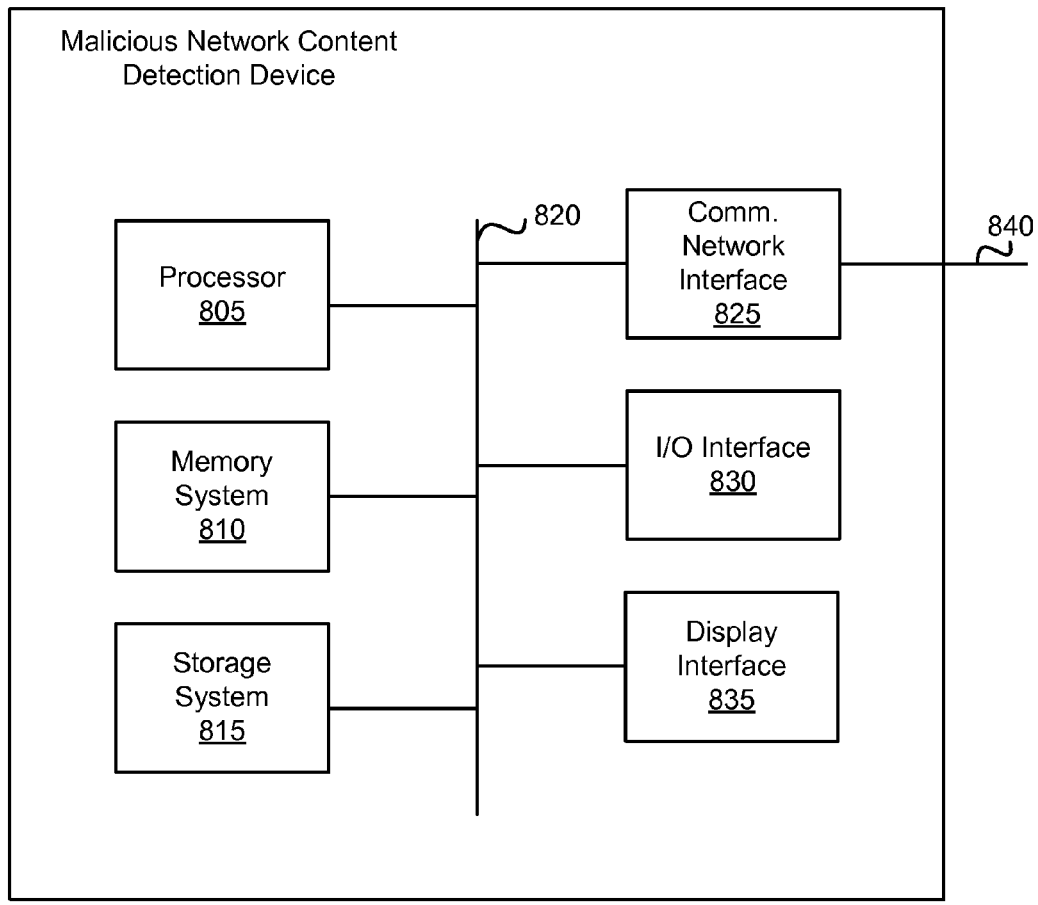
FIG. 8 is a block diagram of an exemplary malicious network content detection device.

FIG. 8 is a block diagram of an exemplary malicious network content detection device. In some embodiments, the method of FIG. 8 provides more detail for malicious network content detection system 125 of FIG. 1. Malicious network content detection system 125 comprises at least one or more processors 805, memory systems 810, and storage systems 815, each of which can be communicatively coupled with data bus 820. In some embodiments, data bus 820 may be implemented as one or more data buses. Malicious network content detection system 125 may also comprise communication network interface 825, input/output (I/O) interface 830, and display interface 835. Communication network interface 825 may be communicatively coupled with network 120 via communication medium 840. In some embodiments, malicious network content detection system 125 may be communicatively coupled with a network tap, such as network tap 115, which in turn may be communicatively coupled with network 120. Bus 920 provides communications between communications network interface 825, processor 805, memory system 810, storage system 815, I/O interface 830, and display interface 835.

Communications network interface 825 may communicate with other digital devices (not shown) via communications medium 840. Processor 905 executes instructions which may be stored on a processor-readable storage medium. Memory system 810 may store data permanently or temporarily. Some examples of memory system 810 include RAM and ROM. Storage system 815 also permanently or temporarily stores data. Some examples of storage system 815 are hard discs and disc drives. I/O interface 830 may include any device that can receive input and provide output to a user. I/O interface 830 may include, but is not limited to, a keyboard, a mouse, a touch screen, a keypad, a biosensor, a compact disc (CD) drive, a digital video disc (DVD) drive, an optical disk drive, or a floppy disk drive. Display interface 835 may include an interface configured to support a display, monitor, or screen. In some embodiments, malicious network content detection system 125 comprises a graphical user interface to be displayed to a user over a monitor in order to allow the user to control malicious network content detection system 125.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for network-based file analysis for malware detection by a system, the method comprising:
   receiving network content;
   identifying a binary packet being assembled in accordance with one or more communication protocols from a plurality of communication protocols supported by the system and in accordance with one or more formats from a plurality of formats supported by the system, the binary packet being a portion of a binary file that is part of the network content;

extracting the binary file from the network content, the binary file comprises one or more binary packets, including the binary packet;

classifying the extracted binary file as suspicious network content or non-suspicious network content, wherein the suspicious network content has a suspicious characteristic related to malicious network content;

processing the suspicious network content using a virtual environment component configured within a virtual environment to mimic operations of a real application configured to process the suspicious network content; and identifying the suspicious network content as malicious network content based on a behavior of the virtual environment component, the identifying of the suspicious network content as malicious network content based on the behavior of the virtual environment component comprises examining the behavior of the virtual environment component against an expected behavior.

2. The method of claim 1, wherein identifying the binary packet includes a binary identification module identifying the packet in one of multiple protocols, the binary identification module configured to recognize each of the multiple protocols.

3. The method of claim 1, wherein identifying the binary packet includes a binary identification module identifying the packet in one of multiple formats, the binary identification module configured to recognize each of the multiple formats.

4. The method of claim 1, wherein extracting the binary file includes utilizing Transmission Control Protocol (TCP) sequence numbers in order to put binary packets in a correct order.

5. The method of claim 4, wherein the TCP sequence numbers are used for binary packet ordering to simulate correct transmission of binary packets of the extracted binary file to a virtual machine of the virtual environment.

6. The method of claim 1, wherein classifying the extracted binary file as suspicious network content or non-suspicious network content comprises performing static analysis based on heuristics on the extracted binary file to classify the extracted binary file.

7. The method of claim 6, wherein performing static analysis includes determining if obfuscation is present.

8. The method of claim 6, wherein performing static analysis includes examining a size of the extracted binary file.

9. The method of claim 1, further comprising performing pre-verification on the extracted binary file that, prior to processing the suspicious network content within the virtual environment, determines whether the extracted binary file matches a known malware.

10. The method of claim 9, wherein the pre-verification on the extracted binary file is conducted after the extracted binary file is classified as suspicious network content.

11. The method of claim 1, wherein the classifying of the extracted binary file comprises determining whether information within the extracted binary file matches information within a known malware, the information within the known malware comprises at least one of binary file header data, signature data or binary files previously classified as malicious.

12. The method of claim 1, wherein the one or more communication protocols include Hypertext Transfer Protocol (HTTP).

13. The method of claim 12, wherein the one or more formats include Multipurpose Internet Mail Extensions (MIME).

14. The method of claim 1, wherein the one or more communication protocols include File Transfer Protocol (FTP).

15. The method of claim 1, wherein the one or more formats include a particular data compression format.

16. The method of claim 1, wherein the one or more formats include a particular encoding format.

17. The method of claim 16, wherein the binary file is an executable binary file.

18. The method of claim 1, wherein the binary file is an executable binary file.

19. The method of claim 18, wherein the virtual environment component is further configured to execute the executable binary file.

20. The method of claim 1, wherein identifying a binary packet further comprises identifying the binary packet based on packet header data.

21. The method of claim 1, wherein the classifying the extracted binary file as suspicious network content or non-suspicious network content comprises classifying the extracted binary file as one of suspicious network content and non-suspicious network content, wherein the extracted binary file is classified as suspicious network content when the extracted binary file has a suspicious characteristic related to malicious network content and does not match a known malware.

22. The method of claim 1, wherein the virtual environment component includes a virtual environment operating system that is configured to perform in a similar manner as a real operating system and detect attempted changes and actual changes to an operating system which are unexpected.

23. The method of claim 1, wherein the classifying of the extracted binary file comprises determining whether the extracted binary file matches a known malware, which includes one or more malicious binary files, by calculation and comparison of one or more checksums.

24. The method of claim 1, wherein prior to the processing of the suspicious network content, the method comprises the classifying of the extracted binary file by determining whether the extracted binary file has the suspicious characteristic related to malicious network content and performing a pre-verification operation on the extracted binary file to determine whether the extracted binary file matches a known malware.

25. The method of claim 24, wherein the known malware is a known malicious binary file.

26. The method of claim 24, wherein the classifying of the extracted binary file is conducted by a static analysis module executed by one or more processors implemented within the system.

27. The method of claim 24 further comprising declaring the suspicious network content as malicious network content when the extracted binary file matches the known malware, wherein the classifying of the extracted binary file is conducted by a static analysis module executed by one or more processors implemented within the system.

28. The method of claim 27 further comprising placing the extracted binary file under quarantine and providing only the suspicious network content for processing by the virtual environment component.

29. The method of claim 1, wherein the examining the behavior of the virtual environment component against the expected behavior comprises comparing the behavior of the virtual environment component observed during processing of the suspicious network content to the expected behavior of the virtual environment component.

30. The method of claim 29, wherein the expected behavior includes a particular process changing an operating system parameter and the behavior observed during processing of the suspicious network content is an attempt to change the operating system parameter without using the particular process.

31. The method of claim 29, wherein the behavior observed during processing of the suspicious network content includes an attempt to change to an operating system setting and the expected behavior has no change in the operating system setting.

32. The method of claim 1, wherein the expected behavior includes one or more stored behavior patterns associated with the virtual environment component and the behavior of the virtual environment component differs from the one or more stored behavior patterns.

33. The method of claim 32, wherein the one or more stored behavior patterns for the virtual environment component being a virtual environment network browser indicates that at least one particular request to transmit over a network is directed toward a specified proxy address.

34. The method of claim 32, wherein the one or more stored behavior patterns identifies parameters values that are to remain unchanged.

35. The method of claim 32, wherein the one or more stored behavior patterns identifies code that is to be invoked when attempting to change a particular parameter.

36. The method of claim 1, wherein the examining of the behavior of the virtual environment component against the expected behavior occurs during replay in which (i) at least the virtual environment component is (a) retrieved from a virtual environment component pool operating as a data store containing one or more applications or one or more operating systems, (b) configured to mimic the real application in which the network content was intended to be processed and (c) provided to the virtual environment, and (ii) the information associated with the extracted binary file is executed by the virtual environment component within the virtual environment.

37. The method of claim 1, wherein the extracting the binary file, classifying the extracted binary file as suspicious network content, processing the suspicious network content, and identifying the suspicious network content as malicious network content is conducted automatically without user intervention.

38. The method of claim 1, wherein the virtual environment component comprises a virtual environment application being configured to perform as the real application.

39. The method of claim 38, wherein the virtual environment component comprises a browser application.

40. The method of claim 1, wherein the virtual environment component comprises a virtual environment operating system that is an actual operating system that mimics operations of the real application being an actual operating system.

41. A system for network-based file analysis for malware detection, the system comprising:
one or more processors; and
a memory system communicatively coupled to the one or more processors, the memory system comprises executable instructions including
a binary identification module to receive and identify a binary packet assembled in accordance with one or more communication protocols from a plurality of communication protocols supported by the system in accordance with one or more formats from a plurality of formats supported by the system, the binary packet being a portion of a binary file that is part of network content;
a binary extraction module communicatively coupled with the binary identification module and configured to extract the binary file including the identified binary packet from the network content;
a static analysis module configured to classify the extracted binary file as suspicious network content or non-suspicious network content, wherein the suspicious network content has a suspicious characteristic related to malicious network content; and
a virtual machine analysis module configured to process the suspicious network content using a virtual environment component configured within a virtual environment to mimic operations of a real application configured to process the suspicious network content, the virtual machine analysis module being further configured to identify the suspicious network content as malicious network content based on a behavior of the virtual environment component by examining the behavior of the virtual environment component against an expected behavior.

42. The system of claim 41, wherein the binary extraction module extracts a binary file utilizing Transmission Control Protocol (TCP) sequence numbers in order to put binary packets of the extracted binary file in a correct order.

43. The system of claim 41, wherein the static analysis module is communicatively coupled with the binary extraction module.

44. The system of claim 43, wherein the static analysis module is configured to determine based on heuristics if an extracted binary file is suspicious or non-suspicious.

45. The system of claim 41, wherein the static analysis module is further configured to determine if obfuscation is present.

46. The system of claim 41, further comprising a pre-verification module operating with the static analysis module to classify the extracted binary file as malicious network content upon determining that the extracted binary file matches a known malware.

47. The system of claim 46, wherein the pre-verification module is configured to perform pre-verification on the extracted binary file classified as the suspicious network content in order to determine if the extracted binary file matches the known malware by information within the extracted binary file matching at least one of binary file header data, signature data or binary files already classified as malicious.

48. The system of claim 46, wherein the pre-verification module re-classifies the extracted binary file as malicious network content upon determining that the extracted binary file matches the known malware or otherwise retain classification of the extracted binary file as suspicious network content.

49. The system of claim 46, wherein the pre-verification module determining whether the extracted binary file matches the known malware that includes one or more malicious binary files by calculating and comparing one or more checksums of the extracted binary file to one or more stored checksums.

50. The system of claim 46, wherein pre-verification module operating on the suspicious network content provided by the static analysis module.

51. The system of claim 46, wherein the static analysis module is a separate module from the pre-verification module.

52. The system of claim 46, wherein the pre-verification module further placing the extracted binary file under quarantine and providing only the suspicious network content for processing by the virtual environment component of the virtual machine analysis module.

53. The system of claim 46, wherein the pre-verification module is operable separate from the static analysis module.

54. The system of claim 41, wherein the virtual environment component is retrieved from a virtual environment component pool, the virtual environment component pool being a data store that contains different component types including one or more applications or one or more operating systems.

55. The system of claim 54, wherein the virtual environment component pool is located within the system.

56. The method of claim 41 wherein the static analysis module declaring the suspicious network content as malicious network content when the extracted binary file matches a known malware, wherein the classifying of the extracted binary file is conducted by the static analysis module executed by one or more processors implemented within the system.

57. The system of claim 56, wherein the known malware is a known malicious binary file.

58. The system of claim 41, wherein the static analysis module is configured to classify the extracted binary file as suspicious network content or non-suspicious network content by classifying the extracted binary file as one of suspicious network content and non-suspicious network content when the extracted binary file has a suspicious characteristic related to malicious network content and does not match a known malware.

59. The system of claim 41, wherein the virtual environment component includes a virtual environment operating system that is configured to perform as an operating system and detect attempted changes and actual changes to the operating system which are unexpected.

60. The system of claim 41, wherein the static analysis module declaring the suspicious network content as malicious network content when the extracted binary file matches a known malware, wherein the classifying of the extracted binary file is conducted by the static analysis module executed by one or more processors implemented within the system.

61. The system of claim 41, wherein the virtual machine analysis module examining the behavior of the virtual environment component against the expected behavior comprises comparing the behavior of the virtual environment component observed during processing of the suspicious network content to the expected behavior of the virtual environment component.

62. The system of claim 61, wherein the expected behavior includes a particular process changing an operating system parameter and the behavior observed during processing of the suspicious network content is an attempt to change the operating system parameter without using the particular process.

63. The system of claim 61, wherein the behavior observed during processing of the suspicious network content includes an attempt to change to an operating system setting and the expected behavior has no change to the operating system setting.

64. The system of claim 41, wherein the expected behavior includes one or more stored behavior patterns associated with the virtual environment component and the behavior of the virtual environment component differs from the one or more stored behavior patterns.

65. The system of claim 64, wherein the one or more stored behavior patterns for the virtual environment component being a virtual environment network browser indicates that at least one particular request to transmit over a network is directed toward a specified proxy address.

66. The system of claim 64, wherein the one or more stored behavior patterns identifies parameters values that are to remain unchanged.

67. The system of claim 64, wherein the one or more stored behavior patterns identifies code that is to be invoked when attempting to change a particular parameter.

68. The system of claim 41, wherein the virtual machine analysis module examining of the behavior of the virtual environment component against the expected behavior occurs during replay in which (i) at least the virtual environment component is retrieved from a virtual environment component pool operating as a data store containing one or more applications or one or more operating systems, configured to mimic the real application in which the network content was intended to be processed, and provided to the virtual environment, and (ii) the information associated with the extracted binary file is executed by the virtual environment component within the virtual environment.

69. The system of claim 41, wherein the binary identification module, the binary extraction module, the static analysis module and the virtual machine analysis module operate automatically without user intervention.

70. The system of claim 41, wherein the virtual environment component being implemented as a specific instance of the application.

71. The system of claim 41, wherein the virtual environment component being implemented as a specific instance of the application.

72. The system of claim 41, wherein the virtual environment component comprises a virtual environment application being configured to perform as the real application.

73. The system of claim 72, wherein the virtual environment component comprises a browser application.

74. The system of claim 41, wherein the virtual environment component comprises a virtual environment operating system that is an actual operating system that mimics operations of the real application being an actual operating system.

75. A non-transitory computer-readable storage medium having stored thereon instructions executable by a processor implemented within a system to perform a method for network-based file analysis for malware detection, the method comprising:
   receiving network content;
   identifying a binary packet being assembled in accordance with one or more communication protocols from a plurality of communication protocols supported by the system in accordance with one or more formats from a plurality of formats supported by the system, the binary packet being a portion of a binary file that is part of the network content;
   extracting the binary file from the network content, the binary file comprises one or more binary packets, including the binary packet;
   classifying the extracted binary file as suspicious network content or non-suspicious network content, wherein the suspicious network content has a suspicious characteristic related to malicious network content;
   processing the suspicious network content using a virtual environment component configured within a virtual environment, wherein the virtual environment component comprises a virtual environment application being configured to simulate a real application configured to process the suspicious network content; and identifying the suspicious network content as malicious network content based on a behavior of the virtual environment component, the identifying of the suspicious network content as malicious network content based on the behavior of the virtual environment component comprises examining the behavior of the virtual environment component against an expected behavior.

76. The non-transitory computer-readable storage medium of claim 75 wherein the processor, upon execution of the stored instructions, further performing operations comprising retrieving the virtual environment component from a virtual environment component pool, the virtual environment component pool being a data store that contains different component types including one or more applications or one or more operating systems.

77. The non-transitory computer-readable storage medium of claim 76, wherein the virtual environment component pool is located within the system.

78. The non-transitory computer-readable storage medium of claim 75, wherein the processor, upon execution of the stored instructions, classifying the extracted binary file as one of suspicious network content and non-suspicious network content, wherein the extracted binary file is classified as suspicious network content when the extracted binary file has a suspicious characteristic related to malicious network content and does not match a known malware.

79. The non-transitory computer-readable storage medium of claim 78, wherein the processor, upon execution of the stored instructions, processing the suspicious network content using a virtual environment component configured within a virtual environment while the non-suspicious network content is not executed within the virtual environment.

80. The non-transitory computer-readable storage medium of claim 75, wherein the virtual environment component includes a virtual environment operating system that is configured to perform as an operating system and detect attempted changes and actual changes to the operating system which are unexpected.

81. The non-transitory computer-readable storage medium of claim 75 wherein the processor, upon execution of the stored instructions, classifying of the extracted binary file by determining whether the extracted binary file matches a known malware, which includes one or more malicious binary files, through calculation and comparison of one or more checksums.

82. The non-transitory computer-readable storage medium of claim 75 wherein the processor, upon execution of the stored instructions, classifying of the extracted binary file by determining whether the suspicious network content has the suspicious characteristic related to malicious network content and performing a pre-verification operation on the extracted binary file to determine whether the extracted binary file matches a known malware.

83. The non-transitory computer-readable storage medium of claim 82, wherein the known malware is a known malicious binary file.

84. The non-transitory computer-readable storage medium of claim 75 wherein the processor, upon execution of a pre-verification module, further comprising declaring the suspicious network content as malicious network content when the extracted binary file matches a known malware, wherein the classifying of the extracted binary file is conducted by a static analysis module executed by the processor of the system.

85. The non-transitory computer-readable storage medium of claim 75, wherein the classifying of the extracted binary file is conducted by a static analysis module executed by the processor implemented within the system.

86. The non-transitory computer-readable storage medium of claim 84 wherein the processor, upon execution of a pre-verification module, further comprising placing the extracted binary file under quarantine and providing only the suspicious network content for processing by the virtual environment component.

87. The non-transitory computer-readable storage medium of claim 75, wherein the processor, upon execution of the stored instructions to examine the behavior of the virtual environment component against the expected behavior, comprises comparing the behavior of the virtual environment component observed during processing of the suspicious network content to the expected behavior of the virtual environment component.

88. The non-transitory computer-readable storage medium of claim 87, wherein the expected behavior includes a particular process changing an operating system parameter and the behavior observed during processing of the suspicious network content is an attempt to change the operating system parameter without using the particular process.

89. The non-transitory computer-readable storage medium of claim 87, wherein the behavior observed during processing of the suspicious network content includes an attempt to change to an operating system setting and the expected behavior has no change in the operating system setting.

90. The non-transitory computer-readable storage medium of claim 75, wherein the expected behavior includes one or more stored behavior patterns associated with the virtual environment component and the behavior of the virtual environment component differs from the one or more stored behavior patterns.

91. The non-transitory computer-readable storage medium of claim 90, wherein the one or more stored behavior patterns for the virtual environment component being a virtual environment network browser indicates that at least one particular request to transmit over a network is directed toward a specified proxy address.

92. The non-transitory computer-readable storage medium of claim 90, wherein the one or more stored behavior patterns identifies parameters values that are to remain unchanged.

93. The non-transitory computer-readable storage medium of claim 90, wherein the one or more stored behavior patterns identifies code that is to be invoked when attempting to change a particular parameter.

94. The non-transitory computer-readable storage medium of claim 75, wherein the processor examining the behavior of the virtual environment component against the expected behavior during replay in which (i) at least the virtual environment component is retrieved from a virtual environment component pool operating as a data store containing one or more applications or one or more operating systems, configured to mimic the real application in which the network content was intended to be processed, and provided to the virtual environment, and (ii) the information associated with the extracted binary file is executed by the virtual environment component within the virtual environment.

95. The non-transitory computer-readable storage medium of claim 75, wherein the extracting of the binary file, classifying the extracted binary file as suspicious network content, processing the suspicious network content, and identifying the suspicious network content as malicious network content is conducted automatically without user intervention.

96. The non-transitory computer-readable storage medium of claim 75, wherein the virtual environment application being implemented as a specific instance of the application.

97. The non-transitory computer-readable storage medium of claim 96, wherein the virtual environment application comprises a browser application.

\* \* \* \* \*